Oct. 16, 1934.                 U. G. SCHAAF                    1,977,491
                            INSIDE GROOVING TOOL
                          Filed Dec. 12, 1933        2 Sheets-Sheet 1
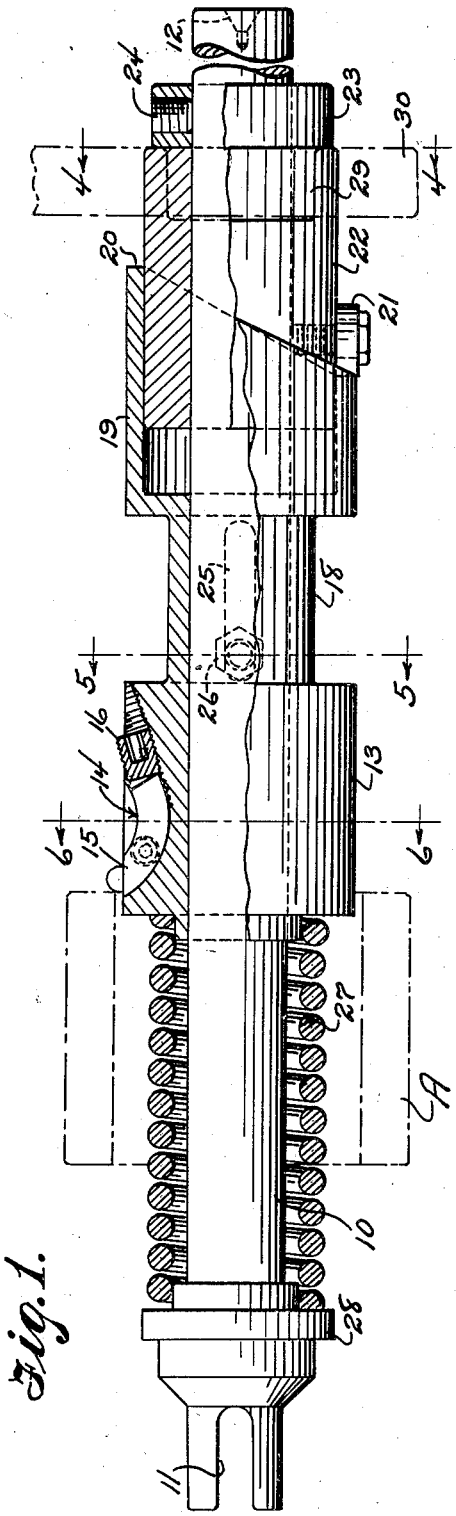
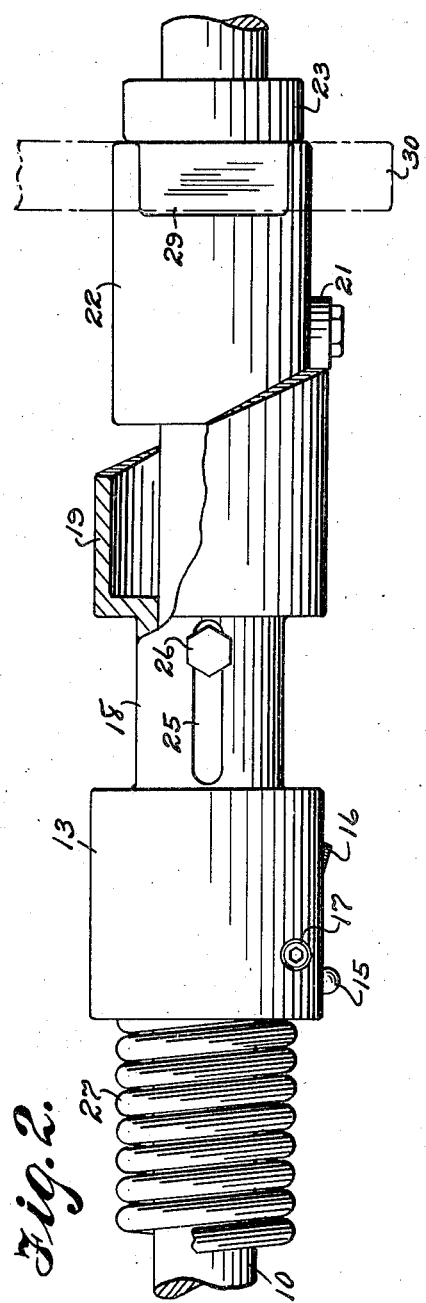
Ulysses G. Schaaf, INVENTOR
BY Victor J. Evans
and Co. ATTORNEY Oct. 16, 1934.   U. G. SCHAAF   1,977,491
INSIDE GROOVING TOOL
Filed Dec. 12, 1933   2 Sheets-Sheet 2
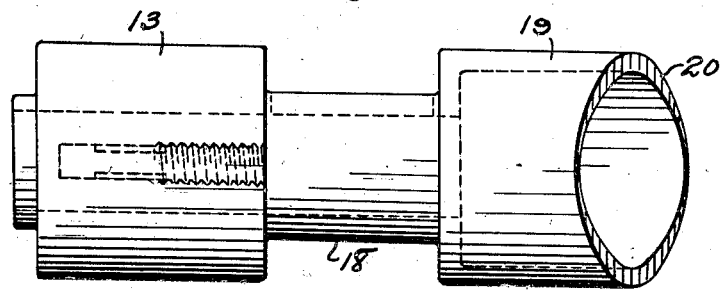
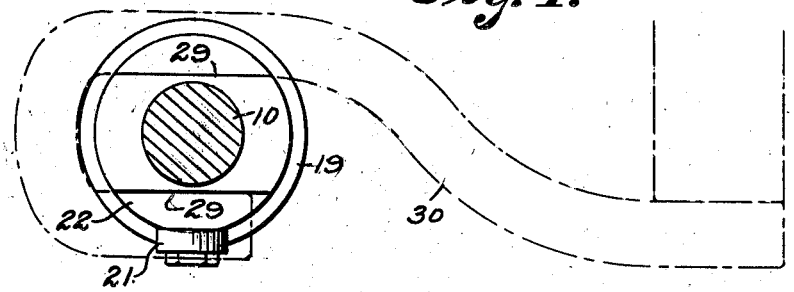
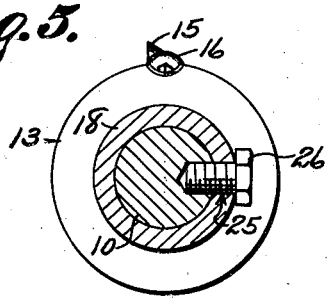
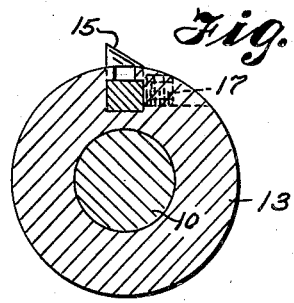
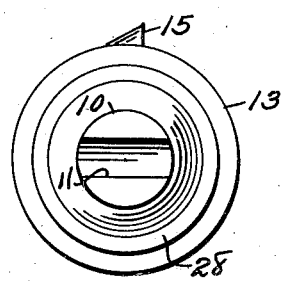
Ulysses G. Schaaf INVENTOR
BY Victor J. Evans
and Co. ATTORNEY Patented Oct. 16, 1934

1,977,491

UNITED STATES PATENT OFFICE 1,977,491

INSIDE GROOVING TOOL

Ulysses G. Schaaf, Lima, Ohio

Application December 12, 1933, Serial No. 702,059

5 Claims. (Cl. 90—33)

The invention relates to a cutting tool and more especially to an inside grooving tool.

The primary object of the invention is the provision of a tool of this character, wherein the same is employed for cutting spiral crisscross oil grooves in automobile connecting rod bearings, it being possible to use the tool for inside cutting jobs on a metal lathe or as a hand tool, and has the advantage of boring, finishing and grooving a connecting rod with a single set-up of the rod.

Another object of the invention is the provision of a tool of this character, wherein the cutting of a perfect spiral groove is accomplished without requiring further machine work, the tool in its entirety being of novel form.

A further object of the invention is the provision of a tool of this character which is simple in construction, reliable and efficient in its purpose, usable in a lathe or by hand, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is an elevation of a tool constructed in accordance with the invention and partly broken away, positioned for the inside grooving of a connecting rod bearing, the latter being shown by dotted lines.

Figure 2 is a view similar to Figure 1, except the bearing, showing the tool advanced through the piece of work.

Figure 3 is a top plan view of the cutter holder and adjuncts.

Figure 4 is a vertical transverse sectional view on the line 4—4 of Figure 1, showing a clamp wrench for use with the tool.

Figure 5 is a sectional view on the line 5—5 of Figure 1 looking in the direction of the arrows.

Figure 6 is a sectional view on the line 6—6 of Figure 1 looking in the direction of the arrows.

Figure 7 is an end elevation.

Similar reference characters indicate corresponding parts throughout the several views in the drawings.

Referring to the drawings in detail, 10 designates a driving shaft having at one end a furcation or slot 11 for driving connection with a source of power, particularly when mounted within a lathe, while the other end of said shaft is provided with the socket 12 so that when the slotted end 11 is in the chuck end of the lathe the tail stock is applied to the opposite end, namely, the end 12 for the lathe center.

Slidably fitted upon the shaft 10 is a cutting blade or bit holder 13 having a socket 14 for the curved standard grooved element or bit 15 which is adjustable by the threaded plug 16 engaged in said socket, the bit or element 15 being held in set cutting position by the set screw 17 which is threaded in the holder 13 at right angles to the socket 14.

The holder is formed with the reduced neck 18 joining therewith the throw-out cam or extension 19 formed with the cam face 20 against which operates a roller 21, the latter journaled upon a hub-like guide 22 fitted upon said shaft 10. This hub 22 is backed by a collar 23 locked to the shaft 10 by a set screw 24.

The neck 18 of the holder 13 is formed with an elongated slot 25 receiving a guide screw 26 threaded in the shaft 10 so that the holder 13 will be guided in its longitudinal displacement upon the shaft 10.

Surrounding the shaft 10 and bearing against the tool holder 13 is a coiled compression spring 27 which is also seated against an annular shoulder 28 on the end 11 of the shaft 10.

In the working of the tool the holder 13 is advanced to the work A for inside grooving thereof against the resistance of the spring 27 which functions at the completion of the work to throw out the tool therefrom. The roller 21 travels upon the cam edge 20 of the extension 19 of said holder 13, thus advancing the cutter or bit 15 in the work and this cutter or bit 15 spirally grooves the work inside thereof. The cam 20 functions to give the holder 13 the proper motion for the grooving action of the cutter or bit 15, as should be apparent.

The guide 22 is formed with opposed flattened wrench-engaging surfaces 29 for the fitting therewith of a special type of wrench 30 for the clamping of this guide, it being understood, of course, that the guide 22 is loose upon the shaft 10.

What is claimed is:

1. A tool of the character described comprising a driving shaft having a coupling end for a source of power, a tool holder slidably and non-rotatably fitted on said shaft, an adjustable groove cutting bit mounted in said holder, a cam extension on said holder, a guide on said shaft and having a roller engageable with the cam extension, and means encircling the shaft for holding the guide against displacement.

2. A tool of the character described comprising a driving shaft having a coupling end for a source of power, a tool holder slidably and non-rotatably fitted on said shaft, an adjustable groove cutting bit mounted in said holder, a cam extension on said holder, a guide on said shaft and having a roller engageable with the cam extension, means encircling the shaft for holding the guide against displacement, and compression means about said shaft and working against the holder to maintain the cam and roller in contact with each other.

3. A tool of the character described comprising a driving shaft having a coupling end for a source of power, a tool holder slidably and non-rotatably fitted on said shaft, an adjustable groove cutting bit mounted in said holder, a cam extension on said holder, a guide on said shaft and having a roller engageable with the cam extension, means encircling the shaft for holding the guide against displacement, compression means about said shaft and working against the holder to maintain the cam and roller in contact with each other, and means engaged with the holder and said shaft for guiding the longitudinal displacement of the holder upon said shaft.

4. A tool of the character described comprising a driving shaft having a coupling end for a source of power, a tool holder slidably fitted on said shaft, an adjustable groove cutting bit mounted on said holder, a cam extension on said holder, a guide on said shaft and having a roller engageable with the cam extension, means encircling the shaft for holding the guide against displacement, compression means about said shaft and working against the holder to maintain the cam and roller in contact with each other, means engaged with the holder and said shaft for guiding the longitudinal displacement of the holder upon said shaft and for preventing relative rotation of the holder and shaft, and a shoulder formed on said shaft and constituting a seat for the second-named means.

5. A tool of the character described comprising a driving shaft having a coupling end for a source of power, a tool holder slidably fitted on said shaft, an adjustable groove cutting bit mounted in said holder, a cam extension on said holder, a guide on said shaft and having a roller engageable with the cam extension, means encircling the shaft for holding the guide against displacement, compression means about said shaft and working against the holder to maintain the cam and roller in contact with each other, means engaged with the holder and said shaft for guiding the longitudinal displacement of the holder upon said shaft and for preventing relative rotation of the holder and shaft, a shoulder formed on said shaft and constituting a seat for the second-named means, and means in the holder for locking the bit in adjusted position therein.

ULYSSES G. SCHAAF.